United States Patent
Krupczak

(10) Patent No.: US 7,430,594 B2
(45) Date of Patent: Sep. 30, 2008

(54) METHOD AND APPARATUS FOR DISTRIBUTED SYSTEMS MANAGEMENT

(75) Inventor: Robert Krupczak, Austell, GA (US)

(73) Assignee: Computer Associates Think, Inc., Islandia, NY (US)

( * ) Notice: Subject to any disclaimer, the term of this patent is extended or adjusted under 35 U.S.C. 154(b) by 700 days.

(21) Appl. No.: 10/055,426

(22) Filed: Jan. 23, 2002

(65) Prior Publication Data
US 2002/0147764 A1 Oct. 10, 2002

Related U.S. Application Data

(60) Provisional application No. 60/264,360, filed on Jan. 26, 2001.

(51) Int. Cl.
*G06F 15/173* (2006.01)
(52) U.S. Cl. .................................... 709/223; 709/224
(58) Field of Classification Search ............... 709/202, 709/224, 223
See application file for complete search history.

(56) References Cited

U.S. PATENT DOCUMENTS

| | | | |
|---|---|---|---|
| 5,682,530 A | | 10/1997 | Shimamura |
| 5,696,693 A | * | 12/1997 | Aubel et al. .................... 716/8 |
| 5,802,146 A | * | 9/1998 | Dulman .................... 379/32.03 |
| 5,826,239 A | | 10/1998 | Du et al. |
| 5,889,470 A | * | 3/1999 | Kaycee et al. ............... 370/465 |
| 6,003,077 A | * | 12/1999 | Bawden et al. .............. 709/223 |
| 6,131,117 A | | 10/2000 | Clark et al. |
| 6,272,537 B1 | * | 8/2001 | Kekic et al. .................. 709/223 |
| 6,286,038 B1 | * | 9/2001 | Reichmeyer et al. ........ 709/220 |
| 6,286,047 B1 | * | 9/2001 | Ramanathan et al. ....... 709/224 |
| 6,356,902 B1 | * | 3/2002 | Tan et al. ....................... 707/10 |
| 6,359,635 B1 | * | 3/2002 | Perttunen .................... 715/834 |
| 6,516,345 B1 | * | 2/2003 | Kracht ....................... 709/220 |
| 6,983,317 B1 | * | 1/2006 | Bishop et al. ............... 709/223 |
| 2002/0078464 A1 | * | 6/2002 | Dravida et al. .............. 725/105 |

OTHER PUBLICATIONS

Keller et al., "Classification and Computation of Dependencies for Distributed Management", Computers and Communications, 2000, *Proceedings, ISCC 2000*, Fifth IEEE Symposium on Jul. 3-6, 2000, XP010505329, pp. 78-83.
Kar et al., "Managing Application Services over Service Provider Networks: Architecture and Dependency Analysis", *IEEE*; Apr. 10, 2000, XP0101376675, pp. 61-74.

* cited by examiner

*Primary Examiner*—William C. Vaughn, Jr.
*Assistant Examiner*—Ranodhi N Serrao
(74) *Attorney, Agent, or Firm*—Pillsbury Winthrop Shaw Pittman, LLP

(57) ABSTRACT

A method and system for managing a distributed computing system relying on the discovery and analysis of dependency data. The implemented system and method utilizes an agent that can detect dependency configuration data stored on network management elements to determine the relationship of elements within the distributed system. Further included is a particular embodiment that displays a root managed device a root distance from a border and displays a non-root managed device having a dependency relationship with the root managed device a predetermined distance from the border that is greater than the root distance.

17 Claims, 7 Drawing Sheets

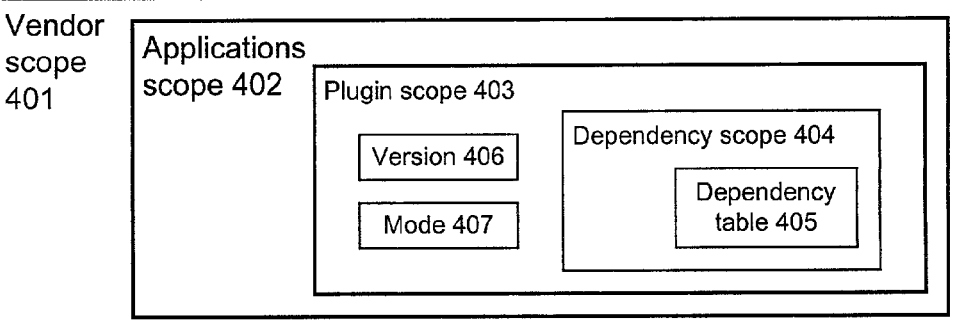

METHOD AND APPARATUS FOR DISTRIBUTED SYSTEMS MANAGEMENT

CLAIM OF PRIORITY

This application claims priority under 35 U.S.C. §119(e) to U.S. Patent Application Ser. No. 60/264,360, filed on Jan. 26, 2001, the entire contents of which are hereby incorporated by reference. In addition, this application claims priority under 35 U.S.C. §119(e) to U.S. Patent Application Ser. No. 60/345, 798, filed on Jan. 2, 2002, entitled "Method and Apparatus for Network Management with Dependency Information", the entire contents of which are hereby incorporated by reference.

TECHNICAL FIELD

This invention relates to distributed systems management, and more particularly to discovery and analysis of dependency data.

BACKGROUND

Referring to FIG. 2A, a distributed systems management environment 20 contains numerous managed devices 21, each with an agent process 25, and at least one management station 22 running a manager process 254. The SNMP protocol 24 allows the manager 254 and agent process 25 to exchange management information. The manager 254 sends messages to the agent process 25 on the managed devices 21 to request information or modify parameters. The agent process 25 replies to the message from the manager 254. The agent process 25 can also initiate communication with the manager 254 via SNMP traps, such as to notify the manager 254 of important events that agent 25 has been configured to monitor.

SNMP is an open Internet standard. SNMP defines a protocol for exchanging management information, a data model, and a set of semantics for the management information. SNMP defines a specification for a management information base, or MIB, using the ASN.1 syntax.

SUMMARY

In general, in one aspect, the invention features a computer-based method for collecting dependency data. The method includes collecting configuration data describing a networked resource. The collection is via a software agent executing on the networked resource. The method also includes selecting dependency data from the configuration data. The dependency data specifies a dependency relationship between the networked resource and another networked resource. The method also includes populating a repository with the dependency data.

In preferred embodiments, the invention includes one or more of the following features. The repository is stored on the first networked resource. The method further includes collecting dependency data from a plurality of networked resources including the first networked resource, and storing the dependency data in a repository centralized within a distributed systems management environment.

In general, in another aspect, the invention features a computer-based method for communicating dependency data, including gathering dependency data on a managed device via an agent on the managed device. The method also includes offering access to a table that includes the dependency data. The access uses a dependency interface for a distributed systems management protocol on the agent.

In general, in still another aspect, the invention features a computer-based method for distributed systems management, including providing a first agent monitoring a first managed device. The first agent gathers dependency data describing a dependency relationship between the first managed device and a second device. The method also includes starting a second agent to monitor the second device based on the dependency data.

In general, in yet another aspect, the invention features a computer-based method for formatting dependency information for display, including providing a display area with a linear border, selecting a root managed device to display at a root distance from the border, and displaying a non-root managed device in a dependency relationship with the root managed device. The dependency relationship has a length of at least one. Displaying includes indenting the representation of the non-root managed device a predetermined distance away from the border. The predetermined distance is greater than the root distance and is dependent upon the length.

In general, in yet still another aspect, the invention features a computer-based method for collecting dependency data, including gathering dependency data on networked resources via software agents. A software agent runs on each such networked resource. The dependency data includes data specifying a dependency relationship between a first networked resource and a second networked resource in the networked resources. The method also includes adding a dependency entry to a central repository managed by a manager application. The dependency entry describes the dependency relationship.

In general, in other aspects, the invention features an apparatus implementing the described methods.

Data describing dependency relationships is often a subset of general configuration data. For instance, many operating systems store dependency data in general-purpose repositories. Dependency discovery filters non-dependency data out to provide focused information, which is useful in systems management.

Automated dependency-based propagation of agents extends the scope of management services to devices that had not been managed or whose agents were inactive prior to propagation. This usefully reduces the burden on human administrators.

Reports of dependency information allow users to examine chains of dependency relationships more readily, which helps in troubleshooting problems and helps users anticipate problems before the problems occur.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2B is a block diagram of a dependency plug-in.

FIG. 3A is a block diagram of a dependency MIB module.

FIG. 3B is a block diagram of a dependency MIB table and a dependency table.

Like reference symbols in the various drawings indicate like elements.

DETAILED DESCRIPTION

Figure 1A:
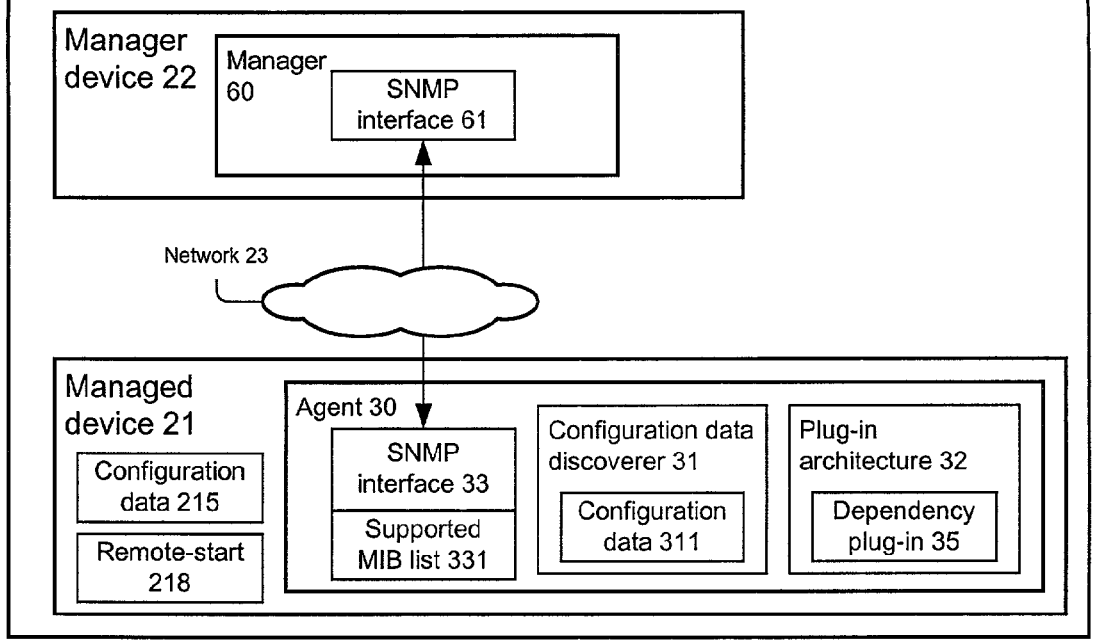
FIG. 1A is a block diagram of a systems management environment.

In the present embodiment, distributed systems management software monitors a collection of networked devices via SNMP over a network. The networked devices run software agents, which handle the SNMP communication with the distributed systems management software and monitor the performance of the networked devices. One feature of the agents examines the networked devices for configuration data, such as network addresses, physical components, resource allocations, and so forth. A subset of the configuration data may describe network resources consumed and provided by each network device, such as network addresses for the resource, access codes, preferred file directories (if the resource is a file server), and so forth.

A dependency relationship exists between a first networked resource and a second networked resource if a problem in the first resource could cause a problem in the second. This is called the "propagation" of a problem from the second resource to the first. The second resource is said to depend on or "consume" the first. Thus, the relationship from the second resource to the first is a "consumer" dependency relationship, while the relationship from the first to the second is a "provider" dependency relationship. The property describing whether a dependency relationship is consumer or provider with regard to its resources is its "direction".

A dependency relationship exists even if the second resource has a failover response, i.e. is configured to handle the first resource's problem gracefully so that no problem actually occurs for the second resource.

The number of resources involved in a given dependency relationship is called the "degree" of the dependency relationship. A relationship that involves just two resources is called "binary". More complicated dependency relationships might not be binary but may involve three or more resources. Such relationships can usually be expressed by a set of binary dependency relationships.

A "networked resource" is an entity monitored by distributed systems management software (hereafter "systems management software"). Since there are many things that systems management software monitors, "networked resource" has a range of meanings. For example, a networked resource can be a software program. Thus, an application or service hosted on a physical device, for instance encoded in a computer memory and executed by a processor, is a networked resource. A networked resource can be largely physical, as with an Ethernet repeater whose function is primarily electrical and involves little information processing of the Ethernet traffic it handles. A networked resource can also include both logical (such as software) and physical components of a networked device, as with a file server whose important functions include both filing system software and physical storage. Another type of networked resource is a collection of resources, where the collection may be a logical construct, such as a level-three network route. Collections such as groups of resources, for instance the group of servers at a physical location, or the group of workstations for a department, are also networked resources.

The agents have plug-in architectures. Each agent includes a dependency plug-in containing features specialized to manage dependency relationships between the networked resources. The dependency plug-in includes a dependency filter to extract dependency data from general configuration data (as well as performance data and traffic analysis, as will be explained). The dependency plug-in stores dependency data in a dependency repository. The dependency plug-in also enables a MIB interface through which the systems management software can manage the agent, including periodically collecting management data that the agent has gathered, and configuring dependency data on the agent. The dependency MIB interface exposes the table structures of the dependency repository. The agent can also raise SNMP traps to the systems management software, with the traps being based on dependency data.

Using the dependency plug-in, the systems management software can automatically configure and activate agents specified by dynamic discovery of dependency data. The dependency plug-in also enables the systems management software to display dependency data to web browser via BFS and DFS indented reports.

Computing Environment

Referring now to FIG. 1A, managed device 21 includes agent 30. Managed device 21 typically has some role on network 23 that makes it of interest to users of manager 22. For instance, managed device 21 can be a user workstation or server. Managed device 21 can also be a networked device that has a role in the operation of network 23, such as a bridge, modem, switch, router, firewall, and the like. Additionally, managed device 21 can be a device shared by users of network 23, such as a printer or network storage.

Figure 1B:
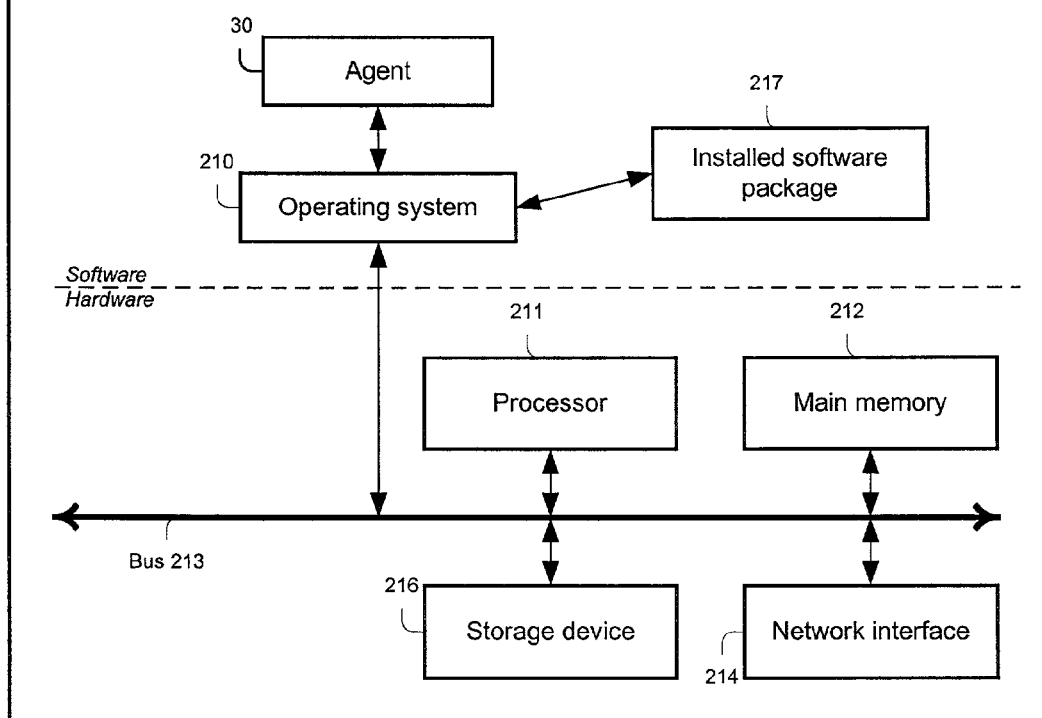
FIG. 1B is a block diagram of components of a managed device.

Referring now to FIG. 1B, agent 30 contains computer instructions and runs on operating system 210. For simplicity, FIG. 1B shows agent 30 interacting with one operating system 210 and related hardware, when in fact component processes of agent 30 may be distributed over multiple computing platforms 63 interconnected by network interfaces 214.

Operating system 210 is a software process, or set of computer instructions, resident in either main memory 212 or non-volatile storage device 216 or both. Processor 211 can access main memory 212 and non-volatile storage device 216 to execute the computer instructions that comprise operating system 210 and agent 30. Access is provided by bus 213.

For the purposes of this description, operating system 210 is understood to include networking services, regardless of whether the networking software is a core part of operating system 210 or is a third-party product.

Non-volatile storage device 216 can be writable storage, such as a disk drive, or read-only storage such as ROM (read-only memory). Bus 213 interconnects processor 211, storage device 216, main memory 212, and network interface 214. Network interface 214 includes a device and software driver to provide network functionality, such as an Ethernet card configured to run TCP/IP, for example. Managed device 21 can have multiple network interfaces 214, for example as required by bridges and the like.

Optionally, managed device 21 includes installed software package 217. Installed software package 217 typically has files in non-volatile storage device 216 related to installation or configuration of the package.

Agent 30 is written primarily in the programming language C. The C code of agent 30 is compiled into lower-level code, such as machine code, for execution on managed device 21. Some components of agent 30 can be written in other languages such as C++ and Java and incorporated into the main body of software code via component interoperability standards.

Agent

Referring now to FIG. 1A, agent 30 assists manager 60 in managing managed device 21 over network 23. Agent 30 is a software process running on managed device 21, in part because common security measures can preclude remote processes from discovering certain privileged information, such as configuration parameters for networking functions.

Agent 30 includes configuration data discoverer 31, which "instruments" (i.e., takes samples of, or measures) configuration parameters 215 and other properties of managed device 21. Configuration data discoverer 31 can also analyze network traffic on network interface 214 to discover relationships such as network addresses and protocols in current use by managed device 21. For example, IP network traffic involving well-known port 80, which is reserved for the HTTP protocol, allows configuration data discoverer 31 to infer that a web server is in use. In general, configuration data discoverer 31 is a general-purpose process for gathering any data that agent 30 requires about managed device 21.

An example of commercially available agent is SystemEDGE, a product of Concord Communication, Inc., of Marlboro, Mass., USA.

Configuration data discoverer 31 represents managed device 21 properties as configuration data objects 311. Example properties represented by configuration data objects 311 include configuration parameters 215 for a variety of services, including: network services, such as default routers and routing paths; parameters for naming services such as DNS and WINS; parameters for directory services such as Active Directory, file systems and file sharing (NFS, SMB); and network protocols such as IP, HTTP, and email. In general, configuration data discoverer 31 populates configuration data objects 311 with configuration information from installed software packages 217 and from services of operating system 210. Configuration data discoverer 31 also queries performance monitoring facilities of operating system 210. Performance monitoring facilities sometimes include configuration data in response to queries about performance. For instance, a query about problematic TCP connections may identify devices that managed device 21 is communicating with.

Agent 30 also includes plug-in architecture 32, which allows plug-ins to extend the functionality of agent 30 without requiring the software code of the agent 30 to be recompiled. In Microsoft Windows, for instance, a plug-in is encoded in a dynamic link library (DLL). In another example, in Unix, a plug-in is encoded in a shared library. Plug-in architecture 32 also allows the functionality provided by a plug-in to be upgraded or removed with minimal effects to the operation of the rest of agent 30.

Agent 30 further includes SNMP interface 33 whereby applications conforming to SNMP 24 can interact with agent 30 over network 23. For instance, manager 60 includes SNMP interface 61, which initiates SNMP exchanges to SNMP interface 33 on agent 30. Typically, manager 60 initiates exchanges with agent 30 that recur at regular intervals, to keep manager 60's state information current regarding managed device 21. This is known as "polling". Agent 30 formulates a response and replies to manager 60 via SNMP messages as required by the SNMP protocol.

SNMP interface 33 also allows agent 30 to initiate SNMP exchanges with manager 60 via SNMP interface 61, for instance to inform manager 60 of important changes in the status of managed device 21. An SNMP exchange initiated by agent 30 is known as a "trap". Traps are a form of asynchronous communication. They are asynchronous relative to the polling schedule of manager 60.

Also, as required by SNMP standards, agent 30 includes a supported MIB list 331. A MIB (management information base) module defines structured types of information. Agent 30 encodes the types as data structures in an interface that can be accessed via SNMP. Each MIB supported by agent 30 through its SNMP interface 33 is included in supported MIB list 331. Agent 30 can support a MIB directly or via a plug-in installed in plug-in architecture 32.

Dependency Plug-In

Plug-in architecture 32 supports dependency plug-in 35, shown in FIG. 1A. Dependency plug-in 35 extends the functionality of agent 30 to discover, analyze, report on, and monitor dependency-related information, among other features.

Figure 2A:
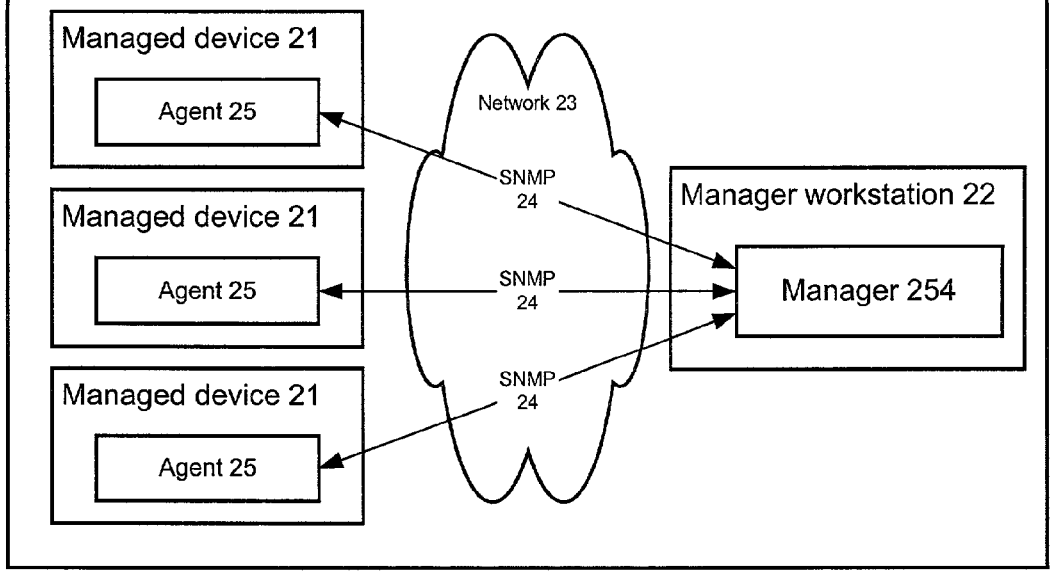
FIG. 2A is a block diagram of a prior art systems management environment.
Figure 2B:
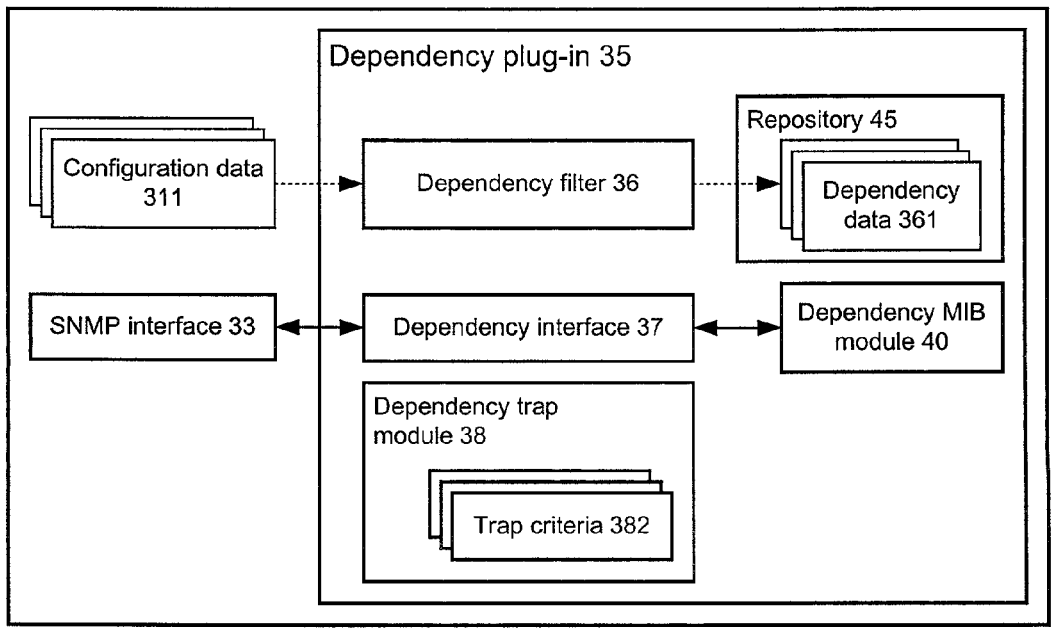

Agent 30 includes dependency plug-in 35 via plug-in architecture 32. Referring now to FIG. 2B, dependency plug-in 35 includes dependency filter 36, dependency interface support 37, and dependency trap module 38.

Dependency filter 36 distinguishes dependency data 361 from non-dependency data among the configuration data objects 311 gathered by configuration data discoverer 31. When dependency filter 36 determines that configuration data object 311 is relevant to some dependency relationship, configuration data object 311 is added to repository 45, which stores dependency data 361.

Dependency interface support 37 extends the function of SNMP interface 33 so that dependency plug-in 35 can support dependency MIB module 40, which agent 30 would not support otherwise. Thus, dependency interface support 37 allows dependency plug-in 35 to add dependency MIB module 40 to supported MIB list 331.

Dependency MIB Module

Dependency MIB module 40 defines a software interface under SNMP 24. The interface presents a view of dependency data 361 in repository 45. Thus, dependency MIB module 40 allows SNMP-compatible applications to collect dependency data 361 from agent 30.

Referring now to FIG. 3A, dependency MIB module 40 includes several scopes of MIB objects. SNMP standards define a universal scheme for MIB objects. Dependency MIB module 40 includes vendor scope 401, which includes applications scope 402. Applications scope 402 includes plug-in scope 403.

Plug-in scope 403 includes version 406, mode 407, and dependency scope 404, which is the scope in which objects unique to dependency plug-in 35 begin to be defined. Version 406 indicated the modification version of dependency plug-in 35. Mode 407 supports licensing considerations. Mode 407 has values for full mode, which enables all features of dependency plug-in 35, and restricted mode, which disables some features of dependency plug-in 35. Dependency scope 404 includes dependency MIB table 405.

Referring now to FIG. 3B, there is a correspondence between dependency MIB table 405 and dependency table 459. In brief, dependency MIB table 405 is an SNMP-compatible interface to dependency table 459. Dependency table 459 is a table that contains entries for dependency data 361. In other words, dependency MIB table 405 is a table data structure that exposes dependency data 361.

Dependency MIB table 405 includes a sequence of dependency entries 41. Dependency entries 41 correspond to rows in dependency table 459 storing dependency data 361. Dependency entry 41 includes a sequence of objects corresponding to fields in dependency data 361. This dependency entry 41 sequence includes index 411, type 412, source 413, server 414, arguments 415, timestamp 416, description 417, and status 418. These objects correspond to fields for index 451, type 452, source 453, server 454, arguments 455, timestamp 456, description 457, and status 458, respectively, in dependency data 361.

For simplicity of explanation, fields in dependency data 361 will be explained in terms of the interface exposed in dependency entry 41. That is, they will not be redundantly explained in terms of dependency data 361).

Index 411 is a unique number identifying dependency entry 41 within dependency MIB table 405.

Type 412 indicates the dependency type. Type 412 includes options for: unknown; other; user defined type; file system; DNS; NIS; email; WINS; router; printer; world wide web; database; Active Directory; DHCP; and HTTP.

Source 413 indicates how the dependency information was discovered. Possible values include static, dynamic, configuration, and unknown. Static means that the dependency was hard-coded in a dependency configuration file. (Such a file can be stored on storage device 637, shown in FIG. 1B, and consulted by configuration data discoverer 31. For instance, a dependency configuration file allows administrators to distribute fixed dependency settings, including user-defined dependency types.) Dynamic means that the dependency was discovered through traffic analysis, while configuration means the dependency was discovered via configuration data 215.

Server 414 indicates the IP address or hostname of an entity providing the resource to managed device 21.

Arguments 415 contains as its value a comma-separated list of keywords paired to values, indicating dependency parameters, arguments to methods, and so forth. An example list occurs in Table 1 under the entry "dependencyArgs". The list of keywords paired to values can support arbitrary keywords, allowing great flexibility in information that can be stored about dependency relationships. For instance, parameters necessary to describe a dependency relationship for a file server may include username, password, and default directory in a list like "username=TOPH,password=TGR, default=C:\". In contrast, parameters necessary to describe a route through an IP network might include a series of hop addresses such as "hop1=A.B.C.D, hop2=W.X.Y.Z" and so forth, where A.B.C.D and W.X.Y.Z denote IP addresses.

One feature of arguments 415 is to distinguish dependencies that themselves depend on a user profile, such as under the security scheme for operating system 631 of managed device 21 (shown in FIG. 1B) when managed device 21 is a workstation. Thus, for instance, dependency data 361 can be stored distinctly for each user of managed device 21 with a keyword pair of "user=Jason" or "user=Rhea".

Another feature of arguments 415 is that they can distinguish consumer relationships from provider relationships, for example with a keyword pair of "direction=consumer" or "direction=provider".

Arguments 415 also support user-defined dependency types, in part by providing a flexible storage format for user-defined dependency parameters. In general, it is up to the SNMP reader using dependency MIB module 40 to parse and interpret information stored in arguments 415.

Timestamp 416 and status 418 support "bookkeeping" features, so to speak, on dependency entry 41. Timestamp 416 indicates the date and time at which this dependency entry 41 was discovered or last updated. Status 418 supports the semantics of the SNMP v2 SMI RowStatus textual-convention given in RFC 1443. In general, status 418 describes administrative states of dependency entry 41 related to creation, deletion, and row-locking of dependency entries 41. Status 418 can be set to instruct dependency plug-in 35 to take actions including adding and removing rows from dependency table 459. Thus, since status 418 is accessible via dependency MIB module 40, status 418 assists in remote configuration of dependency information via SNMP 24, including the addition and deletion of predefined dependency types as well as user-defined types.

Description 417 provides an optional human-readable description for dependency entry 41. Description 417 is used primarily for dependency entries 41 created remotely by manager 60 via SNMP operations or via configuration file directive.

Dependency scope 404 also includes unused index 408, match description 409, and match index 410. Unused index 40 allows SNMP clients to get a value suitable for use as index 411 in a new dependency entry 41, i.e., an unused value.

Match description 409 and match index 410 allow SNMP clients to submit a value for description 417 as a query to get a value for index 411 for matching dependency entries 41. When match description 409 is set by an SNMP client, dependency plug-in 35 responds by populating match index 410 with the index 411 value of the last dependency entry 41 whose description 409 matches the submitted query.

Example Dependency MIB

TABLE 1 shows example code that defines dependency MIB module 40. The code in TABLE 1 conforms to the ANS.1 standard as required by SNMP. Note that a certain amount of description of dependency MIB module 40 is written directly into the code in its DESCRIPTION fields.

TABLE 1

```
EMPIRE-SURVEYOR DEFINITIONS ::= BEGIN
    IMPORTS
        OBJECT-TYPE
                    FROM RFC-1212
            TRAP-TYPE
                    FROM RFC-1215
    DisplayString
        FROM RFC1213-MIB
    enterprises, TimeTicks, Counter, Gauge
        FROM RFC1155-SMI;
         empire         OBJECT IDENTIFIER ::= { enterprises 546 }
         applications   OBJECT IDENTIFIER ::= { empire 16 }
```

TABLE 1-continued

```
        surveyor       OBJECT IDENTIFIER ::= { applications 11 }
        dependencies   OBJECT IDENTIFIER ::= { surveyor 10 }
--
-- Main MIB branch contains module-related items like version,
-- licensing info, etc.
--
        surveyorModVersion OBJECT-TYPE
                SYNTAX DisplayString
                ACCESS read-only
                STATUS mandatory
                DESCRIPTION
                    "Description and version number of this module"
                ::= { surveyor 1 }
    surveyorModMode OBJECT-TYPE
            SYNTAX INTEGER {
               fullMode(1),
               restrictedMode(2)
            }
            ACCESS read-only
            STATUS mandatory
            DESCRIPTION
               "This object indicates if the Module is in
               full-mode or restricted-mode. Restricted-mode
               is entered, when SystemEDGE 4.0 and higher,
               fails to find a valid license. Once
               a valid license has been allocated and
               set, the module will then transition to
               fullMode(1)"
            ::= { surveyor 2 }
--
-- Dependencies Group and Table
--
    dependencyTable OBJECT-TYPE
            SYNTAX SEQUENCE OF DependencyEntry
            ACCESS not-accessible
            STATUS mandatory
            DESCRIPTION
               "This table describes the dependency entries that
               this plugin has discovered."
            ::= { dependencies 1 }
    dependencyEntry OBJECT-TYPE
            SYNTAX DependencyEntry
            ACCESS not-accessible
            STATUS mandatory
            DESCRIPTION
               "An entry in the dependency table."
            INDEX { dependencyIndex }
            ::= { dependencyTable 1 }
    DependencyEntry ::= SEQUENCE {
            dependencyIndex
            INTEGER,
    dependencyType
                        INTEGER,
                 dependencySource
                        INTEGER,
                 dependencyServer
                        DisplayString,
                 dependencyArgs
                        DisplayString,
                 dependencyTimeStamp
                        DisplayString,
                 dependencyDescription
                        DisplayString,
                 dependencyStatus
                        INTEGER
}
dependencyIndex OBJECT-TYPE
       SYNTAX INTEGER (1..2147483647)
       ACCESS read-only
       STATUS mandatory
       DESCRIPTION
                "The index number of this entry; used to uniquely
           identify this entry from others."
       ::= { dependencyEntry 1 }
       dependencyType OBJECT-TYPE
               SYNTAX INTEGER {
                  unknown(1),
                  other(2),
                  userDef(3),
```

TABLE 1-continued

```
            filesys(4),
            dns(5),
            nis(6),
            email(7),
            wins(8),
            router(9),
            printer(10),
            web(11),
            aruser(12),
        database(13),
        activeDir(14),
        dhcp(15),
        http(16)
        }
    ACCESS read-write
    STATUS mandatory
    DESCRIPTION
            "The type of dependency"
    ::= { dependencyEntry 2 }
    dependencySource OBJECT-TYPE
            SYNTAX INTEGER {
                unknown(1),
                static(2),
                dynamic(3),
                configuration(4)
            }
ACCESS read-only
STATUS mandatory
DESCRIPTION
        "How the dependency was discovered; static means
    that the dependency was hard-coded in a dependency
    configuration file, dynamic means that the
    dependency was discovered through traffic
    analysis, while configuration means the dependency
    was discovered via operation system configuration
    file, registry setting, etc."
::= { dependencyEntry 3 }
dependencyServer OBJECT-TYPE
            SYNTAX DisplayString
    ACCESS read-write
    STATUS mandatory
    DESCRIPTION
        "The IP address or hostname of server providing the
        resource to this dependency client. Be careful
        with terms client or server since anything that
        has a dependency on another system is a client in
        one sense and anything that provides a service or
        resource to another system is a server regardless
        of their user-designated functions."
    ::= { dependencyEntry 4 }
    dependencyArgs OBJECT-TYPE
            SYNTAX DisplayString
    ACCESS read-write
    STATUS mandatory
    DESCRIPTION
        "A comma-separated list of keyword=value pairs (no
        spaces) indicating dependency parameters,
        arguments, etc. For the defined dependency types,
        the following are valid dependency arguments:
        Type         | Argument Name | Argument Value
        ------------------------------------------------------
        all          | client        | program name, 'system', pid
        all          | username      | login/username using resource
        email        | proto         | smtp,pop,imap, etc.
        filesys      | filesys       | fs:/fs,\\fs\fs
        filesys      | mountpt       | /filesystem,M:, etc.
        filesys      | type          | nfs,samba,ntfs, etc.
        dns          | order         | 1,2,3, etc.
        dns          | domain        | DNS-domain-name
              email  | type          | smtp,exchange,notes
        nis          | domain        | NIS/NIS+ domain
        wins         | domain        | NT/WINS domain
        printer      | name          | printer name
        router       | routedest     | dest IP or 'default'
        database | dbtype            | sql,oracle,etc.
        database | dbname            | name of database
        http         | homepage      | URL
        http         | proxy         | system:port
        "
```

TABLE 1-continued

```
        ::= { dependencyEntry 5 }
    dependencyTimeStamp OBJECT-TYPE
            SYNTAX DisplayString
        ACCESS read-only
        STATUS mandatory
        DESCRIPTION
           "The date/time at which this dependency was
           discovered or last updated. The format is as
           follows: to local time in the form of a
           26-character string as shown below. Time
           zone and daylight savings corrections are made
           before string generation. The fields are
           constant width:
               Fri Sep 13 00:00:00 1986"
        ::= { dependencyEntry 6 }
    dependencyDescription OBJECT-TYPE
               SYNTAX DisplayString
               ACCESS read-write
               STATUS mandatory
               DESCRIPTION
                  "An optional description for this entry used
           primarily for dependency entries created remotely
           via SNMP manager operations or via configuration
           file directive."
                    ::= { dependencyEntry 7 }
    dependencyStatus OBJECT-TYPE
               SYNTAX INTEGER {
                   active(1),
                   notInService(2),
                   notReady(3),
                   createAndGo(4),
                   createAndWait(5),
                   destroy(6)
    }
               ACCESS read-write
               STATUS mandatory
               DESCRIPTION
                  "The status of this entry. This variable is
                  equivalent in semantics to the V2 SMI
                  RowStatus textual-convention (see RFC 1443).
           Values of active, notInService, and notReady
           should *not* be construed to imply status to the
           physical resource being used. For example,
           a value of active(1) only indicates that the
           dependency has been observed or is known to exist
           but does *not* indicate that the resource is
           actually being used. Setting this object
                     to destroy(2) causes the the plugin to destroy
           this entry (not the actual resource or underlying
           dependency) and free the row's resources (not the
           dependency or its underlying resources). For row
           creation to occur, the manager must supply
           active(1), createAndGo(4), createAndWait(5), or
           notInService(2) as the value of this object."
        DEFVAL { createAndGo }
                ::= { dependencyEntry 8 }
    dependencyUnusedIndex OBJECT-TYPE
               SYNTAX INTEGER (1..2147483647)
               ACCESS read-only
        STATUS mandatory
        DESCRIPTION
           "An SNMP Get of this MIB object returns an un-used
           dependencyTable index number. It can be used for
           dependencyTable row creation optimization."
        ::= { dependencies 2 }
    dependencyMatchDescription OBJECT-TYPE
               SYNTAX DisplayString
               ACCESS read-write
        STATUS mandatory
        DESCRIPTION
           "This MIB object, when used in conjunction with
           dependencyMatchIndex can be used to quickly
           determine the index number corrsponding to a
           particular entry description. SNMP Set'ing a
           description to this MIB object causes the plugin
           to search through entries in the dependencyTable
           and place the index value, of the last entry whose
           description matches the description, in the
           dependencyMatchIndex."
```

TABLE 1-continued

```
    ::= { dependencies 3 }
    dependencyMatchIndex OBJECT-TYPE
            SYNTAX INTEGER (1..2147483647)
            ACCESS read-only
        STATUS mandatory
        DESCRIPTION
            "See description for dependencyMatchDescription."
    ::= { dependencies 4 }
END
```

Dependency Traps

Figure 6A:
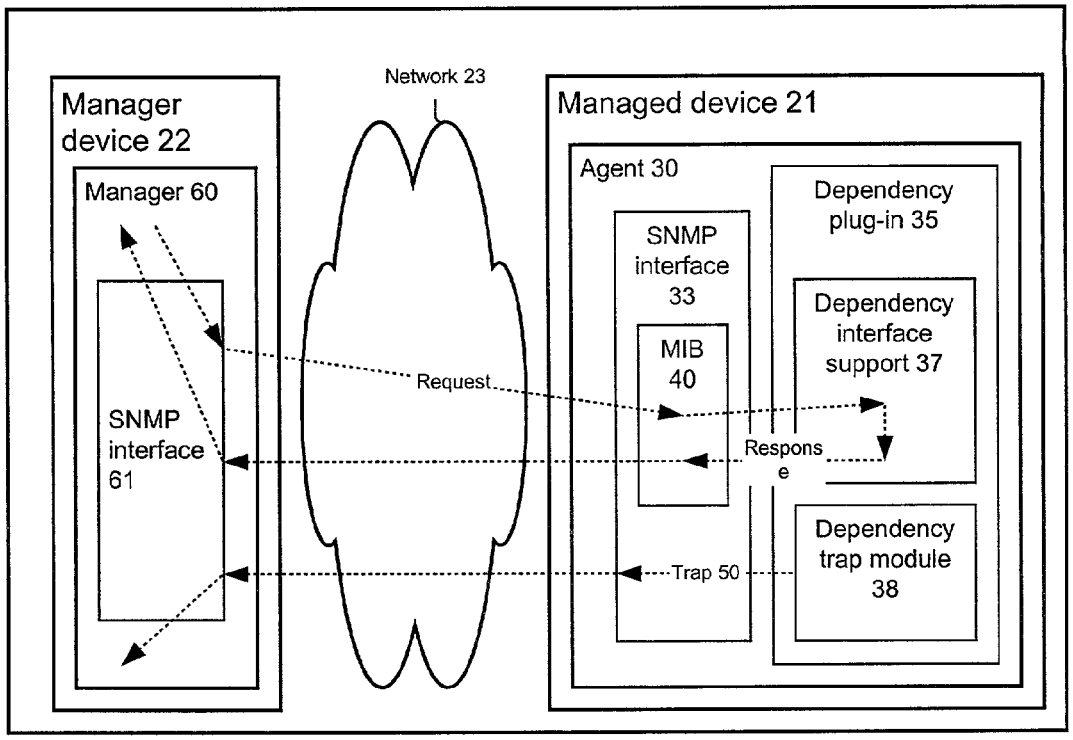
FIG. 6A is a block diagram of SNMP exchanges between a manager and an agent.

Referring now to FIG. 6A, manager 60 interacts with agent 30 via commands (including SNMP set commands) request/response communications from manager 60 to agent 30 and via traps 50 from agent 30 to manager 60. Interactions involve SNMP interface 61 on manager 60 and SNMP interface 33 on agent 30.

Manager 60 initiates a request, which SNMP interface 61 transmits to SNMP interface 33 via network 23. SNMP interface 33 notifies dependency interface support 37 of the request. Dependency interface support 37 formulates a response and passes it to SNMP interface 33, which transmits the response back to SNMP interface 61. SNMP interface 61 notifies manager 60 of the response.

Dependency trap module 38 tests dependencies stored in dependency data 361, raising traps 50 when dependencies are unverifiable or trap criteria 382 (shown in FIG. 2B) indicate conditions for the raise. Dependency trap module 38 passes trap 50 to SNMP interface 33, which transmits trap 50 to SNMP interface 61 via network 23. SNMP interface 61 notifies manager 60 of trap 50.

Figure 6B:
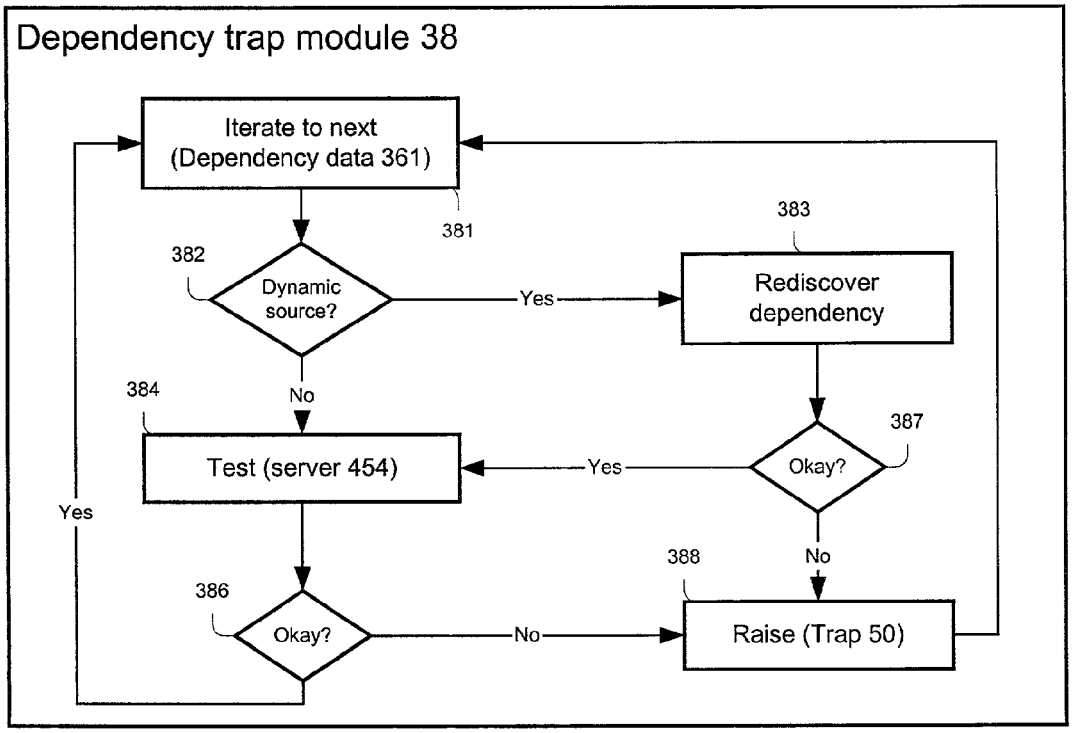
FIG. 6B is a flowchart of a dependency trap module.

Referring now to FIG. 6B, dependency trap module 38 repeatedly iterates over dependency data 361 and related trap criteria 382 (shown in FIG. 2B) to raise traps 50. Dependency trap module 38 iterates to a next dependency data 361 (procedure 381). Dependency trap module 38 tests source field 453 to determine whether dependency data 361 was discovered dynamically (procedure 382). If so, dependency trap module 38 uses configuration data discoverer 31 (shown in FIG. 1A) to verify that the source of information for dependency data 361 is still available or has been verified recently (procedure 383). If the source is not available or its performance is unacceptable (for instance, if the latency period of the source's replies is too large), dependency trap module 38 raises a trap 50 (procedure 388). If the source is still available, or if the source is not discovered dynamically, dependency trap module 38 tests the device specified by server 454 (procedure 384). Dependency trap module 38 can use additional parameters, such as those contained in arguments field 455. For instance, arguments 455 can specify a port to use with an IP address specified by server 454. Dependency trap module 38 can also apply trap criteria 382 to determine whether the dependency is acceptable. If the dependency is not acceptable (procedure 386), dependency trap module 38 raises a trap 50 (procedure 388). Otherwise, dependency trap module 38 returns to iterate to a next dependency data 361 (procedure 381). Dependency trap module 38 returns to iterate to a next dependency data 361 (procedure 381) after raising any trap 50 (procedure 388).

Manager

Manager 60 is a systems management software application compatible with SNMP 24. Manager 60 includes an SNMP interface 61 with which manager 60 initiates SNMP exchanges with agents 30. SNMP interface 61 also receives traps from agents 30 that the manager 60 can react to, for instance by logging the trap event and, if the trap describes a problem with a managed device 21, by informing a user of manager 60 of the problem.

Figure 4A:
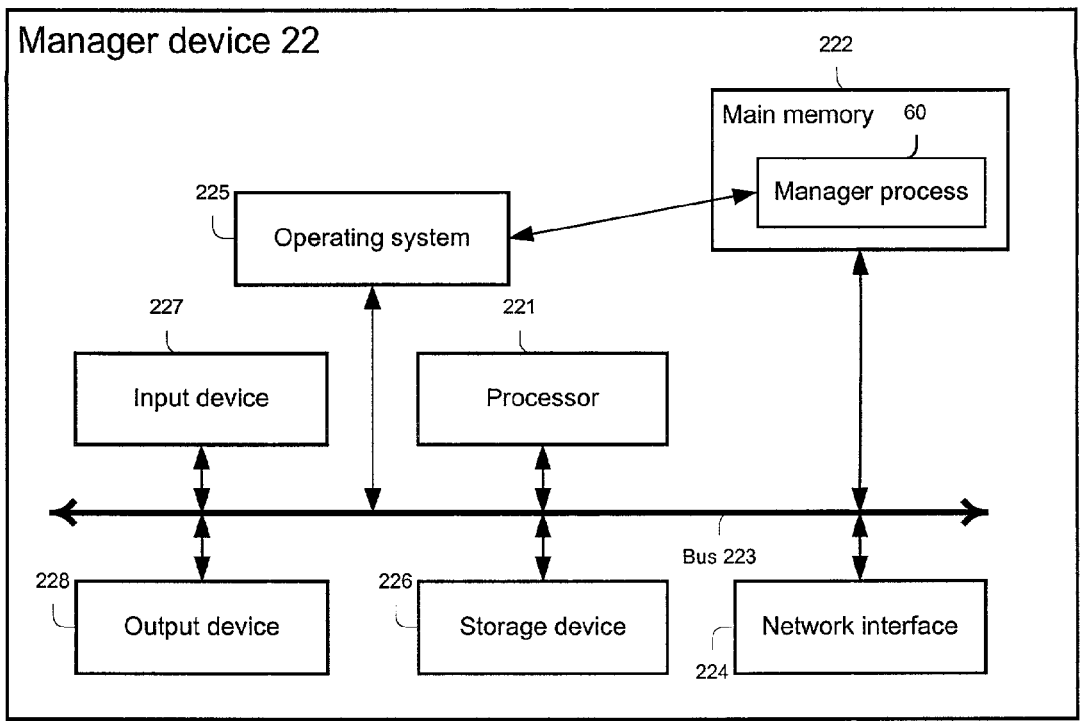
FIG. 4A is a block diagram of a manager device.
Figure 4B:
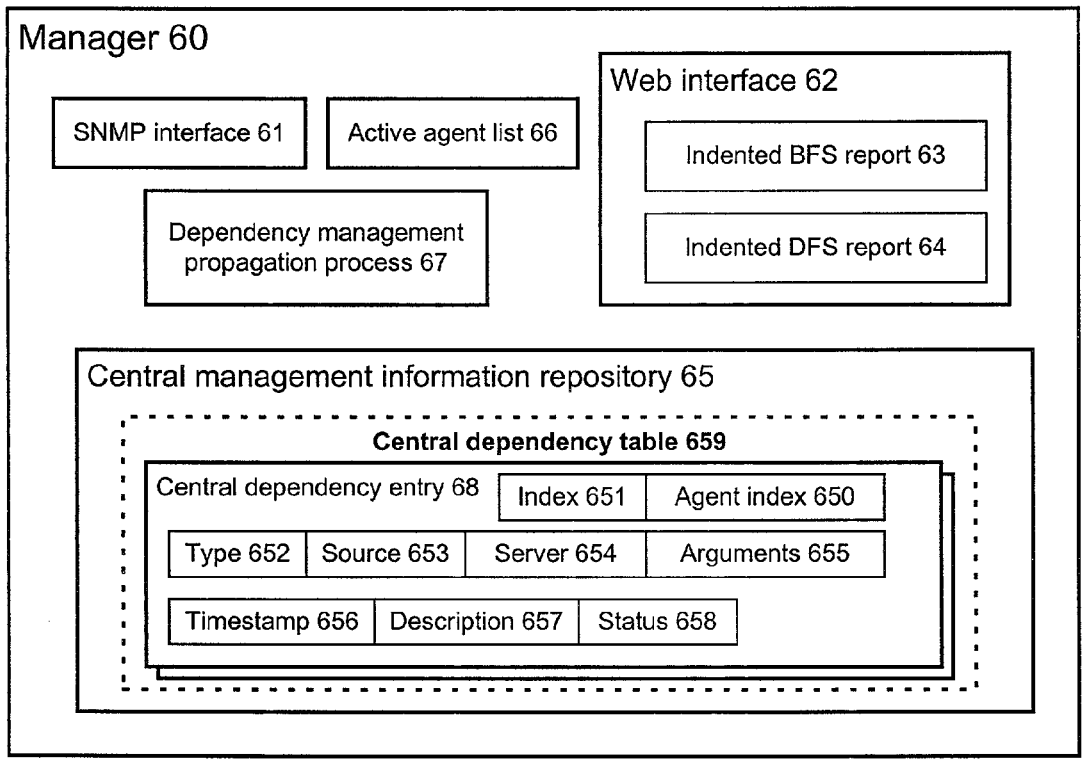
FIG. 4B is a block diagram of a manager process.

Referring now to FIG. 4B, manager 60 maintains a central management information repository 65 of information collected from agents 30, as well as an active agent list 66 of agents 30 currently available for communication with manager 60.

Central management information repository 65 includes a central dependency table 659, which stores data collected from multiple dependency tables 459 on agents 30 in a "central" location, i.e., one that is an authoritative collection point for systems management environment 20. Manager 60 collects dependency data 361 from multiple agents 30, centralizing the entries of their dependency data 361 on manager 60 as central dependency entries 68 in central dependency table 659. Central dependency entry 68 includes fields for index 651, type 652, source 653, server 654, arguments 655, timestamp 656, description 657, status 658, agent index 650, which correspond in datatype and function to the following fields, respectively, of dependency table 459: index 411, type 412, source 413, server 414, arguments 415, timestamp 416, description 417, and status 418, as explained above. Central dependency entry 68 also includes agent index 650, which adopts values corresponding to the agent 30 from which dependency data 361 was collected. In other words, agent index 650 differentiates central dependency entries 68 according to their affiliations with agents 30 (and therefore according to their affiliations with managed devices 21 as well).

Manager 60 includes a dependency web interface 62 for reporting systems management information involving dependencies. Dependency web interface 62 provides report presentations to a user via a web browser. Reports include both the logic necessary to gather the information being reported, as well as one or more presentation specifications for how to format the output. Reports include indented BFS report 63 and indented DFS report 64. "BFS" stands for breadth-first search. "DFS" stands for depth-first search. Indented BFS report 63 and indented DFS report 64 display dependency information by organizing a collection of data around a specific managed device 21 and visually laying out a representation of the consumer dependency relationships for that device 21. Specifically, reports 63 and 64 internally represent dependency information as a graph, with managed devices 21 as nodes and dependency relationships as edges connecting nodes. Indented BFS report 63 and indented DFS report 64 use BFS and DFS traversals, respectively, of the graph to sequence the dependency information with respect to a root device. Indented BFS report 63 and indented DFS report 64 also use indentation away from a margin to indicate path length in the graph away from the root device: the shortest indentation indicates path length one (1), the next-shortest indicates path length two (2), and so forth. Path length in the graph corresponds to dependency length.

Dependency Length

Dependency relationships between two networked resources can be either immediate or indirect. A dependency relationship is immediate between two networked resources if it describes a dependency of one upon the other. An indirect dependency relationship is between two networked resources A and B such that no immediate dependency relationship exists between A and B but there exists a sequence of networked resources A, C1, C2, C3, etc., ending in B, such that immediate dependency relationships exist between all adjacent pairs in the sequence, the directions of the relationships on all such pairs agree, and a given problem state at one end of the relationship can lead to a problem state at the opposite end. Put another way, indirect dependency relationships are transitive and describe paths that problems follow. If A is in an immediate dependency relationship with C and C is in an immediate dependency relationship with B, and the direction from A to C is the same direction from C to B, then A is in an indirect dependency relationship with B if a problem in B can propagate to A.

Not all transitive chains of immediate dependency relationships lead to indirect dependency relationships. An indirect dependency relationship extends only as far as its initial causative problem can propagate. If X is a consumer of Y and Y is a consumer of Z, but no problem of Z can propagate through Y to X, then X does not have an indirect dependency relationship with Z via Y.

The "length" of a dependency relationship is defined to be the minimum number of immediate dependency relationships needed to construct a sequence that qualifies the dependency relationship as an indirect dependency relationship, as described above. The length of an immediate dependency relationship is therefore one. The length of an indirect dependency relationship is at least two.

As an example, suppose a workstation computer has an immediate consumer relationship with an email server, and the email server has an immediate consumer relationship with a security server. Further suppose the workstation computer has no immediate consumer relationship with the security server. Then the workstation computer still has an indirect consumer relationship of length two with the security server, by virtue of the email server. Now suppose that a laptop computer also has an immediate consumer relationship with the email server. The laptop does not have a dependency relationship with the workstation computer (even though there is a dependency between workstation and email server, and another dependency between email and laptop), because the direction of the former dependency is "consumer" while the direction of the latter is "provider".

Indented BFS Report

Figure 5A:
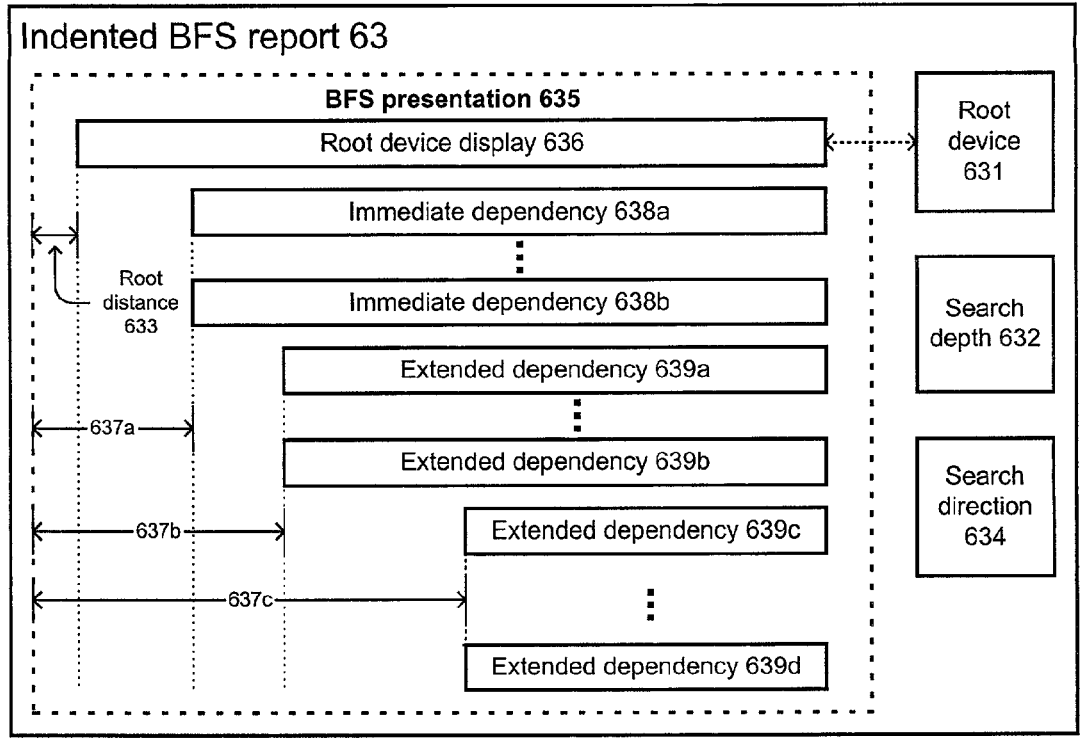
FIG. 5A is a block diagram of an indented BFS report.

Referring now to FIG. 5A, indented BFS report 63 takes a specific managed device 21 as an input parameter and labels it the root device 631. Indented BFS report 63 also takes a search depth 632 as an input parameter. Search depth 632 is an integer greater than zero that provides an upper bound on the path lengths displayed in the indented BFS report 63. Additionally, indented BFS report 63 takes a search direction 634 as an input parameter. Search direction 634 specifies whether indented BFS report 63 is restricted to consumer or provider dependency relationships with regard to root device 631.

Indented BFS report 63 includes BFS presentation 635, which is a formatted presentation of data put out by indented BFS report 63.

BFS presentation 635 has a tabular layout, with rows corresponding to dependencies. BFS presentation 635 has a linear border from which the rows are offset (i.e., indented). In the example of FIG. 5A, the linear border is the left edge. The first dependency row in BFS presentation 635 includes root device display 636, which represents root device 631. Root device display 636 is offset from the linear border by root distance 633. Root distance 633 can be zero, i.e., root device display 636 can abut the linear border.

Immediate dependencies 638 represent binary dependencies for which one of the network resources is root device 631. Because of the BFS approach, all dependencies of length one precede all dependencies of higher length in BFS presentation 635. Thus, immediate dependencies 638 are arranged following root device display 636. BFS presentation 635 indents immediate dependencies 638 by a first distance, proportionate indentation 637a in the example of FIG. 5A. This first distance is visibly greater than root distance 633. Proportionate indentation 637 is constant among representation of dependencies of same length to graphically indicate the length of the dependency relationship relative to root device 631.

A first set of extended dependencies 639a-639b is represented if search depth 632 is greater than one and if BFS presentation 635 finds dependencies of length two, relative to root device 631. FIG. 5A illustrates the offset distance for this set with proportionate indentation 637b, chosen to be visibly greater than indentation 637a.

Subsequent set of extended dependencies 639 are represented if search depth 632 allows and if BFS presentation 635 finds dependencies of sufficient length, relative to root device 631. Note that it follows from the definition of length that if a dependency of length N exists, then a dependency of length N-1 exists (for N greater than 1). Therefore BFS presentation 635 never need "skip" a set of extended dependencies 639 en route to a next such set. FIG. 5A illustrates the offset distance for a second set of extended dependencies 639c-639d with proportionate indentation 637c, chosen to be visibly greater than indentation 637b. In general, proportionate indentation 637 for dependencies of length N are visibly greater than proportionate indentation 637 for dependencies of length N-1.

Rows for root device display 636, immediate dependencies 638, and extended dependencies 639 can contain data from any fields in repository 45.

The dotted vertical lines in FIG. 5A are for illustrative purposes, showing the left-alignment distances of the rows in BFS presentation 635 as a reference for proportionate indentations 637. The dotted vertical lines are optional in the actual display of BFS presentation 635.

Indented DFS Report

Figure 5B:
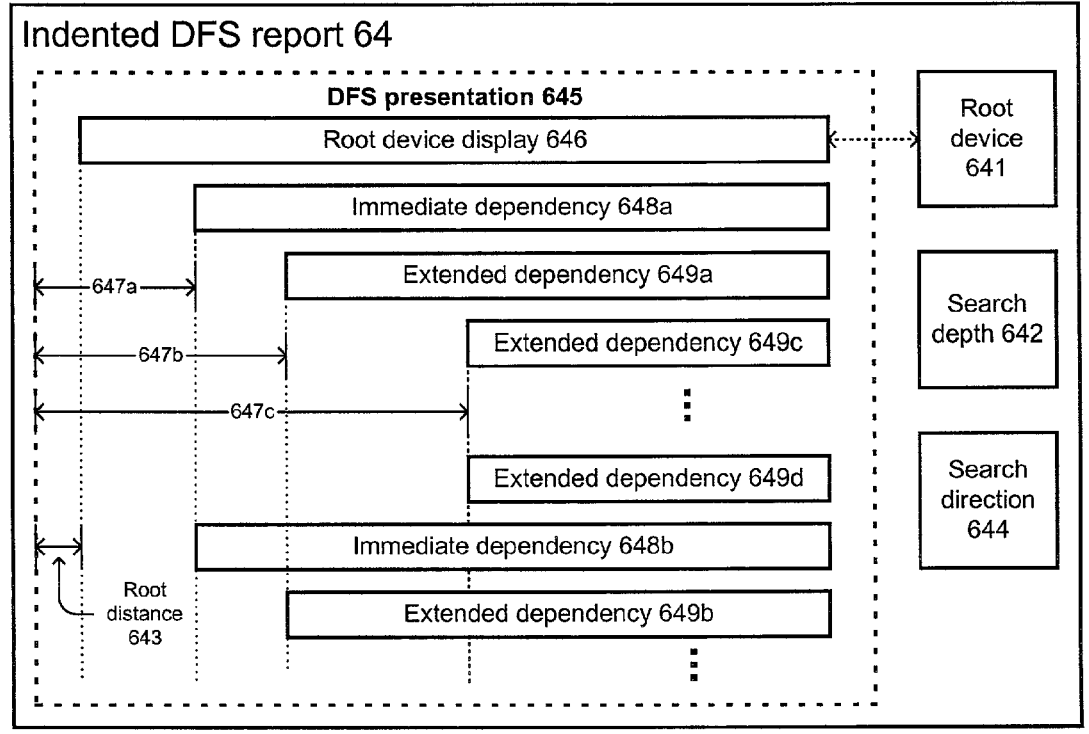
FIG. 5B is a block diagram of an indented DFS report.

Referring now to FIG. 5B, indented DFS report 64 takes a specific managed device 21 as an input parameter; this device 21 is labeled the root device 641. Indented BFS report 64 also takes a search depth 642 as an input parameter. Search depth 642 is an integer greater than zero that provides an upper bound on the path lengths displayed in the indented DFS report 64. Additionally, indented DFS report 64 takes a search direction 644 as an input parameter. Search direction 644 specifies whether indented DFS report 64 is restricted to consumer or provider dependency relationships with regard to root device 641.

Indented DFS report 64 includes DFS presentation 645, which is a formatted presentation of data put out by indented DFS report 64.

DFS presentation 645 has a tabular layout, with rows corresponding to dependencies. DFS presentation 645 has a linear border from which the rows are offset (i.e., indented). In the example of FIG. 5B, the linear border is the left edge.

The first dependency row in DFS presentation 645 includes root device display 646, which represents root device 641. Root device display 646 is offset from the linear border by root distance 643. Root distance 643 can be zero, i.e., root device display 646 can abut the linear border.

Immediate dependencies 648 represent dependencies of length one with regard to root device 641. Because of the DFS approach, a first dependency of length one follows root device display 646. In the example of FIG. 5B, this is immediate dependency 648a. It is followed by extended dependency 649a (the first dependency of length two) and extended dependency 649c (the first dependency of length three). Immediate dependency 648b is the second dependency of length one.

According to the DFS approach, all descendants of immediate dependency 648a are displayed before immediate dependency 648b. All descendents of this second dependency of length one are displayed before the third dependency of length one is displayed, and so forth. This arrangement holds recursively for dependencies of higher length, as well.

DFS presentation 645 uses the same indentation scheme to assign indentations 647 as BFS presentation 635 uses to assign indentations 637. Similarly, rows for root device display 646, immediate dependencies 648, and extended dependencies 649 can contain data from any fields in repository 45. As with FIG. 5A, the dotted vertical lines in FIG. 5B are for illustrative purposes, showing the left-alignment distances of the rows in DFS presentation 645 as a reference for proportionate indentations 647. The dotted vertical lines are optional in the actual display of DFS presentation 645.

Automated Dependency-Based Propagation of Management Agents

Figure 7A:
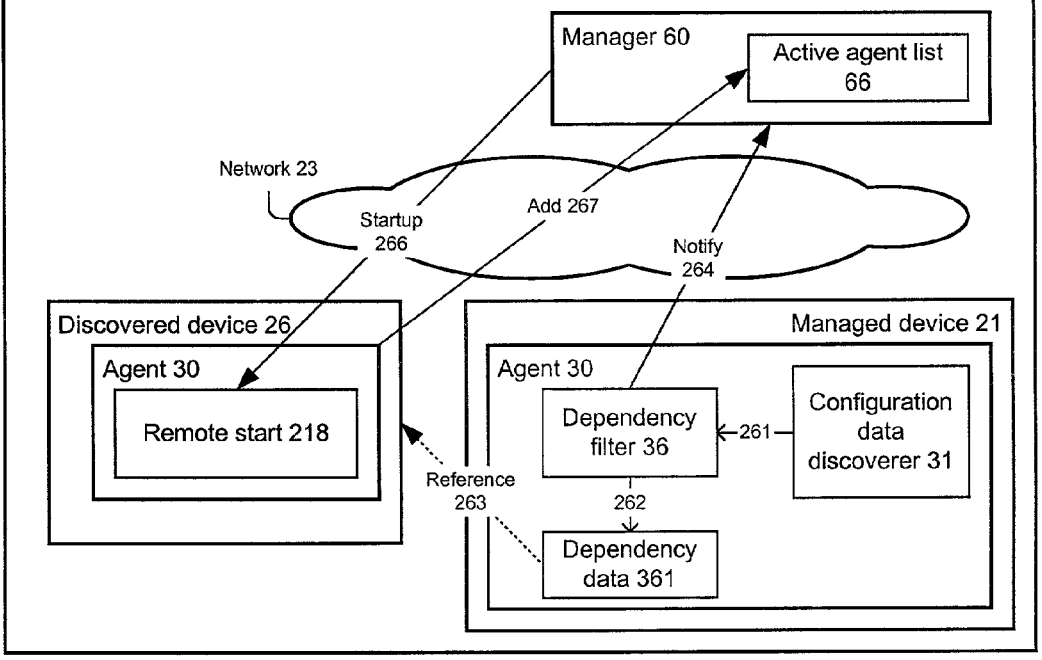
FIG. 7A illustrates a data flow for automated activation of agents using discovered dependency.

Referring now to FIG. 7A, manager 60 is not initially managing discovered device 26. Manager 60 can automatically activate or configure an agent 30 on discovered device 26 to bring discovered device 26 under management by manager 60, if dependency data 361 indicates that a managed device 21 is in a dependency relationship with discovered device 26. In other words, manager 60 can automatically process information to reclassify a discovered device 26 as a managed device 21. This extends the management capabilities of manager 60 to the discovered device 26, when manager 60 was not previously managing the discovered device 26.

The processing of information is as follows. Configuration data discoverer 31 discovers configuration data 311 (shown in FIG. 1A) and passes it to dependency filter 36 (procedure 261). Dependency filter 36 verifies that configuration data 311 includes dependency data 361 (procedure 262), specifying a consumer relationship with discovered device 26 (procedure 263). Dependency filter 36 notifies manager 60 of dependency data 361 (procedure 264). Manager 60 uses information in dependency data 361 specifying discovered device 26 and contacts remote start facility 218 on agent 30 on discovered device 26 (procedure 266). Upon successful remote start, agent 30 on discovered device 26 contacts manager 60 to be included in active agent list 66 (procedure 267).

Figure 7B:
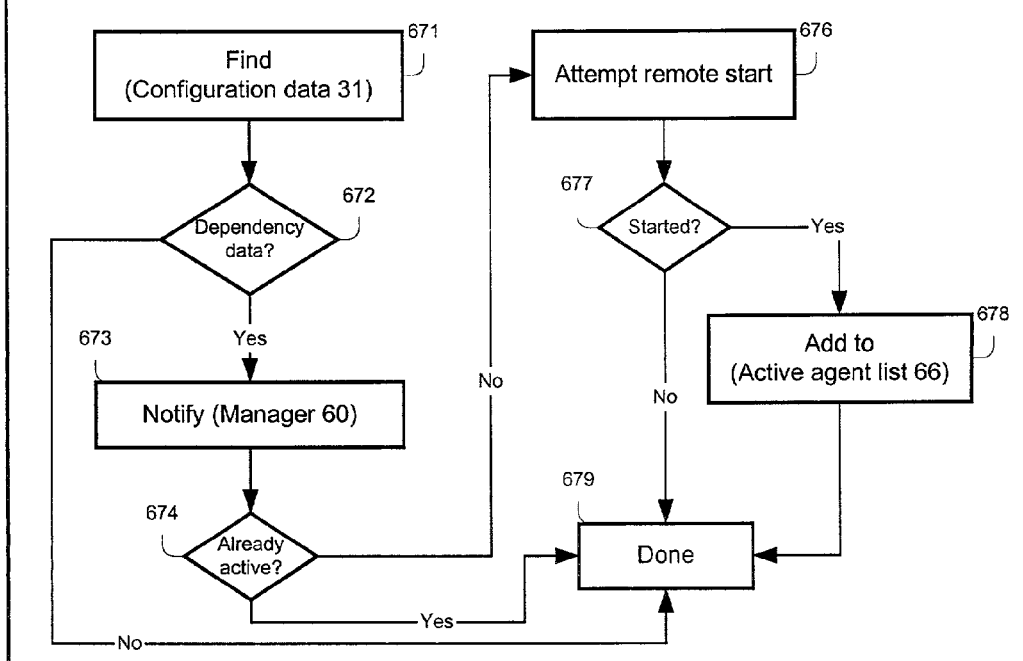
FIG. 7B is a flowchart for a dependency management propagation process.

Referring now to FIG. 7B, a process for distributed dependency management propagation 67 proceeds as follows. Configuration data discoverer 31 discovers configuration data 311 (procedure 671). Dependency filter 36 tests configuration data 311 for qualifications as dependency data 361 (procedure 672). If the test fails, distributed dependency management propagation 67 concludes (procedure 679). If the test succeeds, dependency filter 36 notifies manager 60 and specifies dependency data 361 (procedure 673). Manager 60 consults active agent list 66 to determine whether the device specified by dependency data 361 already has an active agent 30 under control of manager 60 (procedure 674). If an active agent 30 exists, distributed dependency management propagation 67 concludes (procedure 679). Otherwise, manager 60 attempts a remote start of agent 30 on discovered device 26 using remote start facility 218 (procedure 676). If the remote start fails, distributed dependency management propagation 67 concludes (procedure 679). Otherwise, agent 30 on discovered device 26 contacts manager 60 to be included in active agent list 66, and manager 60 begins managing agent 30 (procedure 678). Discovered device 26 thus becomes a managed device 21, and distributed dependency management propagation 67 concludes (procedure 679).

At times, for instance due to security or administration policies on discovered device 26, manager 60 cannot activate an agent 30 on discovered device 26. In this case, manager 60 configures agent 30 for activation at a later time. There is still a benefit to configuration without activation, at least in that manager 60 has automatically reclassified discovered device 26 to be a managed device 21 at some future point. Thus, manager 60 still extends the number of devices 21 under management.

ALTERNATIVE EMBODIMENTS

A number of embodiments of the invention have been described. Nevertheless, it will be understood that various modifications may be made without departing from the spirit and scope of the invention. For example, the functions of the dependency plugin 35 need not be added to agent 30 via the plugin architecture 32: such functions could be incorporated into the software code of agent 30 directly. Also, although the present embodiment uses SNMP and MIB's, any open systems management protocol, or general purpose protocol such as XML adapted to systems management, together with interfaces supporting the security, get, and set features of MIB's, could be substituted in place of SNMP and MIB's.

Central dependency table 659 and dependency table 459 have each been described as a table. However, central dependency table 659 and dependency table 459 could each (or both) be implemented as a collection of tables or a relational database view based on one or more tables.

FIG. 1B shows a managed device 21 with a processor 211. Managed device 21 could have multiple processors 211.

Accordingly, other embodiments are within the scope of the following claims.

What is claimed is:

1. A computer-based method for communicating dependency data specifying dependency relationships between networked resources, including:

monitoring a first managed networked resource via a software agent executing on the first managed networked resource, wherein the software agent is managed by a software manager executing remotely from the first managed networked resource;

collecting, by the software agent executing on the first managed networked resource, configuration data describing the first managed networked resource;

extracting, by the software agent executing on the first managed networked resource, dependency data from the configuration data, the dependency data specifying either provider or consumer dependency relationships between the first managed networked resource and one or more other managed networked resources, wherein said provider dependency relationship indicates that a first problem at the first managed networked resource will propagate to the one or more other managed networked resources, and said consumer dependency relationship indicates that a second problem at the one or more other managed networked resources will propagate to the first managed networked resource;

generating, at the first managed networked resource, a table that includes the extracted dependency data, wherein the table is stored separate from other configuration data associated with the first managed networked resource that has been collected by the software agent;

offering access to the extracted dependency data in the table generated at the first managed networked resource, the access being offered via a dependency interface of the software agent executing on the first managed networked resource, the dependency interface being an interface for a distributed systems management protocol; and communicating the dependency data from the software agent to the software manager.

2. The method of claim 1, further including:

collecting dependency data from a plurality of networked resources including the first managed networked resource; and storing the dependency data in a repository centralized within a distributed systems management environment, wherein the centralized repository is stored in the software manager of the distributed systems management environment separately from other configuration data associated with the plurality of networked resources.

3. The method of claim 1, where the distributed systems management protocol is an open standard.

4. The method of claim 3, wherein offering access includes the software manager communicating across a network with the software agent using the distributed systems management protocol.

5. The method of claim 4, wherein the software agent communicates with the software manager using the distributed systems management protocol to raise a trap based on the dependency data included in the table.

6. The method of claim 1, where the distributed systems management protocol is SNMP.

7. A computer-based method for distributed systems management, including:

monitoring a first managed network device with a first software agent executing on the first managed network device, wherein the software agent is managed by a software manager executing remotely from the first managed network device;

collecting, by the software agent executing on the first network device, configuration data describing the first managed network device;

gathering, by the first software agent executing on the first managed network device, dependency data describing either a provider or a consumer dependency relationship between the first managed network device and one or more other network devices, wherein said provider dependency relationship indicates that a first problem at the first managed network device will propagate to the one or more other network devices, and said consumer dependency relationship indicates that a second problem at the one or more other network devices will propagate to the first managed network device;

communicating, by the first software agent executing on the first managed network device, the dependency data gathered by the first software agent to the software manager;

processing, by the software manager, the gathered dependency data obtained from the first software agent to determine whether either the provider or the consumer dependency relationship exists between the first managed network device and a second network device; and initiating, by the software manager, a second software agent if either the provider or the consumer dependency relationship exists between the first managed network device and the second network device, wherein the second software agent executes on and monitors the second network device.

8. The method of claim 7, further comprising: adding the second software agent to an active agent list by the software manager, the active agent list maintained at the software manager; and classifying, by the software manager, the second network device as a second managed network device managed by the software manager.

9. The method of claim 7, further comprising:

determining, by the software manager, whether the second network device is a device that is managed by the software manager;

initiating, by the software manager, a second software agent on the second network device if either the provider or the consumer dependency relationship exists between the first managed network device and a second network device and if the second network device is a device that is not managed by the software manager.

10. The method of claim 9, wherein the determining whether the second network device is a device managed by the software manager comprises determining whether the second software agent executing on the second network device is included in an active agent list maintained by the software manager.

11. A computer-based method for collecting dependency data specifying dependency relationships between networked resources, the method including:

monitoring a plurality of managed networked resources via a software agent executing on each of the managed networked resources, wherein the plurality of software agents are managed by a software manager executing remotely from the plurality of managed networked resources;

gathering, by the plurality of software agents executing on the plurality of managed networked resources, configuration data describing the plurality of networked resources;

extracting, by the plurality of software agents, dependency data from the gathered configuration data, the dependency data including data specifying either provider or consumer dependency relationships associated with the plurality of managed networked resources, wherein said provider dependency relationship indicates that a first problem at a first managed networked resource will propagate to a second networked resource, and said consumer dependency relationship indicates that a second problem at the second networked resource will propagate to the first managed networked resource;

communicating the dependency data extracted by the plurality of software agents from the plurality of software agents to the software manager;

adding at least a portion of the dependency data extracted by the plurality of software agents to a central repository managed by the software manager, wherein the portion of the dependency data added to the central repository is stored in the central repository separately from other configuration data;

processing, by the software manager, the extracted dependency data obtained from the plurality of software agents to determine whether either the provider or the consumer dependency relationships exist between at least one of the plurality of managed networked resources and one or more additional networked resources not included in the plurality of managed networked resources; and initiating, by the software manager, management of the one or more additional networked resources not included in the plurality of managed networked resources if either the provider or the consumer dependency relationships exist between at least one of the plurality of managed networked resources and the one or more additional networked resources.

12. The method of claim 11, wherein the software manager offers a client application access to the central repository, the access offered using a distributed systems management protocol.

13. The method of claim 12, wherein the distributed systems management protocol is SNMP.

14. The method of claim 11, wherein initiating, by the software manager, management of the one or more additional networked resources further comprising:

initiating, by the software manager, one or more additional software agents at the one or more additional networked resources if either the provider or the consumer dependency relationships exist between at least one of the plurality of managed networked resources and the one or more additional networked resources, wherein each of the one or more additional software agents execute on and monitor the corresponding one or more additional networked resources;

adding the one or more additional software agents to an active agent list by the software manager, the active agent list maintained at the software manager; and classifying, by the software manager, the one or more additional networked resources as one or more additional managed networked resources managed by the software manager.

15. An article comprising a machine-readable storage medium that stores executable instructions to communicate dependency data specifying dependency relationships between networked resources, the instructions causing a machine to:

monitor a first managed networked resource via a software agent executing on the first managed networked resource, wherein the software agent is managed by a software manager executing remotely from the first managed networked resource;

collect, by the software agent executing on the first managed networked resource, configuration data describing the first managed networked resource;

extract, by the software agent, dependency data from the configuration data, the dependency data specifying either provider or consumer dependency relationships between the first managed networked resource and the one or more other managed networked resources, wherein said provider dependency relationship indicates that a first problem at the first managed networked resource will propagate to the one or more other managed networked resources, and said consumer dependency relationship indicates that a second problem at the one or more other managed networked resources will propagate to the first managed networked resource;

generate, at the first managed networked resource, a table that includes the extracted dependency data, wherein the table is stored separate from other configuration data associated with the first managed networked resource that has been collected by the software agent;

offer access to the extracted dependency data in the table generated at the first managed networked resource, the access being offered via a dependency interface of the software agent executing on the first managed networked resource, the dependency interface being an interface for a distributed systems management protocol; and communicate the dependency data from the software agent to the software manager.

16. The article of claim 15, further including instructions causing the machine to:

collect dependency data from a plurality of networked resources including the first networked resource; and store the dependency data in a repository centralized within the software manager of a distributed systems management environment, wherein the centralized repository is stored in the software manager of the distributed systems management environment separately from other configuration data associated with the plurality of networked resources.

17. An article comprising a machine-readable storage medium that stores executable instructions to manage distributed systems, the instructions causing a machine to:

monitor a first managed network device with a first software agent executing on the first managed network device, wherein the software agent is managed by a software manager executing remotely from the first managed network device;

collect, by the software agent executing on the first managed network device, configuration data describing the first managed network device;

gather, by the first software agent, dependency data describing either a provider or a consumer dependency relationship between the first managed network device and one or more other network devices, wherein said provider dependency relationship indicates that a first problem at the first managed network device will propagate to the one or more network devices, and said consumer dependency relationship indicates that a second problem at the one or more network devices will propagate to the first managed network device;

communicate, by the first software agent executing on the first managed network device, the dependency data gathered by the first software agent to the software manager;

process, by the software manager, the gathered dependency data obtained from the first software agent to determine whether either the provider or the consumer dependency relationship exists between the first managed network device and a second network device; and initiate, by the software manager, a second software agent if either the provider or the consumer dependency relationship exists between the first managed network device and a the second network device, wherein the second software agent executes on and monitors the second network device.

* * * * *

UNITED STATES PATENT AND TRADEMARK OFFICE
CERTIFICATE OF CORRECTION

PATENT NO. : 7,430,594 B2
APPLICATION NO. : 10/055426
DATED : September 30, 2008
INVENTOR(S) : Robert Krupczak It is certified that error appears in the above-identified patent and that said Letters Patent is hereby corrected as shown below:

On the Title Pg

Related U.S. Application Data should read

Item (60) Provisional application No. 60/264,360, filed on Jan. 26, 2001, and Provisional application No. 60/345,798, filed on Jan. 2, 2002.

Signed and Sealed this

Seventeenth Day of March, 2009

JOHN DOLL
*Acting Director of the United States Patent and Trademark Office*